us009054579B2

(12) United States Patent
Shimizu

(10) Patent No.: US 9,054,579 B2
(45) Date of Patent: Jun. 9, 2015

(54) POWER SUPPLY CIRCUIT

(71) Applicant: FUJITSU TEN LIMITED, Kobe-shi, Hyogo (JP)

(72) Inventor: Yuichiro Shimizu, Kobe (JP)

(73) Assignee: FUJITSU TEN LIMITED, Kobe (JP)

( * ) Notice: Subject to any disclaimer, the term of this patent is extended or adjusted under 35 U.S.C. 154(b) by 0 days.

(21) Appl. No.: 13/860,829

(22) Filed: Apr. 11, 2013

(65) Prior Publication Data

US 2013/0285635 A1 Oct. 31, 2013

(30) Foreign Application Priority Data

Apr. 27, 2012 (JP) ................. 2012-102789

(51) Int. Cl.
*H02J 7/00* (2006.01)
*H02M 3/156* (2006.01)

(52) U.S. Cl.
CPC .................... *H02M 3/156* (2013.01)

(58) Field of Classification Search
CPC .......................................... H02J 7/345
USPC ............................... 320/166, 167
See application file for complete search history.

(56) References Cited

U.S. PATENT DOCUMENTS 8,378,634 B2 * 2/2013 Kung ............................ 320/132
2009/0184700 A1 * 7/2009 Kanayama .................... 323/282

FOREIGN PATENT DOCUMENTS

JP 07-325633 * 12/1995 ............ H02J 7/00
JP A-7-325633 12/1995
JP A-2010-224825 10/2010

* cited by examiner

*Primary Examiner* — Edward Tso
*Assistant Examiner* — Ahmed Omar
(74) *Attorney, Agent, or Firm* — Oliff PLC

(57) ABSTRACT

There is provided a power supply circuit. A switching regulator is configured to drop a battery voltage to a first specific voltage. A series regulator includes a switching element and a capacitor connected at an output stage of the switching element. The series regulator is configured to drop the first specific voltage to a second specific voltage and output the second specific voltage. A control circuit is configured to adjust an amount of electric charge to be accumulated in the capacitor according to a voltage value of the first specific voltage.

5 Claims, 4 Drawing Sheets

POWER SUPPLY CIRCUIT

The disclosure of Japanese Patent Application No. 2012-102789 filed on Apr. 27, 2012, including specification, drawings and claims is incorporated herein by reference in its entirety.

TECHNICAL FIELD

The present invention relates to a power supply circuit for dropping a voltage.

BACKGROUND

A vehicle has various electronic devices (for example, an electronic control unit (ECU)) to which a battery supplies electric power. Also, the vehicle has a power supply circuit which drops an input voltage from the battery and output the dropped voltage to the electronic devices. FIG. 1 is a schematic view illustrating the circuit configuration of a power supply circuit 1a according to the related art.

The power supply circuit 1a mainly includes a switching regulator 10 and a circuit 2a including a series regulator 20a and a control circuit 30a. The power supply circuit 1a uses the switching regulator 10 to drop a voltage BATT (ideal value thereof is 14V) input from a battery 3 and outputs a predetermined voltage VIN (ideal value thereof is 6V). Then, the power supply circuit 1a uses the series regulator 20a of the circuit 2a to drop the voltage VIN, and outputs a predetermined voltage VCC (ideal value thereof is 1.2V) to a load 4 (for example, a micro computer of an ECU).

Also, each of the switching regulator 10 and the series regulator 20a regulates the voltage input thereto within a range having the input voltage as an upper limit, and outputs the regulated voltage. Therefore, if the input voltage becomes lower than a target output voltage, the output voltage also becomes lower than the target output voltage.

In other words, if the voltage BATT of the battery becomes lower than the target output voltage of each regulator, according to the drop of the voltage BATT, the voltage VIN obtained by voltage dropping of the switching regulator 10 and the voltage VCC (the voltage of the load 4) obtained by voltage dropping of the series regulator 20a also become lower than the target voltages. All of voltages to be described in this specification are DC voltages.

Next, the circuit operation of the power supply circuit 1a will be described in detail. The switching regulator 10 drops the voltage BATT input from the battery 3 to the voltage VIN, and outputs the voltage VIN. The voltage VIN output from the switching regulator 10 is input to the circuit 2a through a terminal Ta. Then, the control circuit 30a of the circuit 2a divides the input voltage VIN with resistors. A comparator 303 compares this divided voltage (hereinafter, referred to as a 'first voltage') with a reference voltage (hereinafter, referred to as a 'first reference voltage'). Subsequently, according to the result of the comparison, the control circuit 30a turns on or off a switch 305 for switching the operation state of an amplifier circuit 206 of the series regulator 20a.

The first reference voltage of the comparator 303 has a plurality of threshold values due to hysteresis, but may have one threshold value. Here, the operation of the power supply circuit 1a differs depending on whether the voltage VIN has a voltage value equal to or greater than a predetermined voltage (for example, 6V or greater) or the voltage VIN has a voltage value less than the predetermined voltage (for example, less than 6V). In other words, the output of the comparator 303 changes depending on whether the first voltage has a voltage value equal to or greater than the first reference voltage or the first voltage is less than the first reference voltage. According to the change in the output of the comparator 303, the switch 305 is turned on or off, resulting in the difference in the operation of the power supply circuit 1a. For this reason, the two cases will be separately described below.

<Case Where Voltage VIN is 6V or Greater>

In the case where the voltage VIN is 6V or greater, that is, in a case where the first voltage is equal to or greater than the first reference voltage, according to the output of the comparator 303, the switch 305 becomes an ON state. As a result, the amplifier circuit 206 of the series regulator 20a becomes an operable state.

Further, the output voltage of the series regulator 20a is divided with resistors, and this divided voltage (hereinafter, referred to as a 'second voltage') is input to a non-inverting input terminal of an error amplifier 204. Then, the error amplifier 204 compares the second voltage with a reference voltage (hereinafter, referred to as a 'second reference voltage'). In a case where the second voltage has a voltage value less than the second reference voltage, the error amplifier 204 drives a PNP transistor 201 to raise the second voltage. In other words, the PNP transistor 201 becomes an ON state, a current flows between the emitter and the collector of the PNP transistor, and the potential of the voltage VCC increases. As a result, for example, even when the voltage value of the voltage BATT of the battery 3 decreases temporarily and thus the output voltage of the series regulator 20a drops, the power supply circuit 1a can output an optimal voltage for the operation of the load 4.

The error amplifier 204 operates to stop the PNP transistor 201 to drop the second voltage in the case where the second voltage has a voltage value equal to or greater than the second reference voltage. In other words, the PNP transistor 201 becomes an OFF state, any current does not flow between the emitter and the collector of the PNP transistor 201, and the potential of the voltage VCC drops. As a result, for example, even when the voltage value of the voltage BATT of the battery 3 increases temporarily and the output of the series regulator 20a rises, the power supply circuit 1a can output an optimal voltage for the operation of the load 4.

<Case Where Voltage VIN is Less Than 6V>

In the case where the voltage VIN is less than 6V, that is, in a case where the first voltage is less than the first reference voltage, according to the output of the comparator 303, the switch 305 becomes an OFF state. As a result, the amplifier circuit 206 of the series regulator stops. Therefore, a signal output from an output terminal of the error amplifier 204 is not input to the base of the PNP transistor 201, the PNP transistor 201 becomes the OFF state, and any current does not flow between the emitter and the collector of the PNP transistor 201. Like this, in the case where the voltage VIN is less than 6V, the power supply circuit 1 operates to stop the operation of the load 4. Therefore, the voltage value of the output voltage VCC of the power supply circuit 1a drops to be lower than a voltage value for making the operation of the load 4 possible. Japanese Patent Application Publication No. 2010-224825A explains a technology related to the present invention.

In the above-mentioned power supply circuit 1a, however, in a case where a vehicle transitions from an IG-ON state to an IG-OFF state, that is, in a case where the voltage value of the voltage BATT of the battery 3 drops at a predetermined rate every unit time, the voltage value of the voltage VCC to be output to the load 4 oscillates to be unstable. Here, the oscillation means that the voltage value oscillates at a constant frequency while being equal to or greater than a constant value.

Specifically, the oscillation means that the voltage value of the voltage VIN changes due to a drop of the voltage BATT and the voltage value of the voltage VCC changes according to the change of the voltage value of the voltage VIN. FIG. 2 is charts illustrating changes with time in the voltage BATT, the voltage VIN, and the voltage VCC. Hereinafter, the detailed description will be provided with reference to FIG. 2.

The upper chart of FIG. 2 is a chart illustrating the change with time in the voltage value of the voltage BATT of the battery 3 with a graph line VB. Further, the lower chart of FIG. 2 is a chart illustrating the changes with time in the voltage values of the voltage VIN and the voltage VCC with a graph line VIa and a graph line VCa, respectively. In the upper and lower charts of FIG. 2, the vertical axes represent voltage (V), and the horizontal axes represent time (μsec).

Also, in the lower chart of FIG. 2, a higher threshold value of a plurality of threshold values corresponding to the first reference voltage of the comparator 303 is referred to as a first threshold value th, and a lower threshold value of the plurality of threshold values corresponding to the first reference voltage of the comparator 303 is referred to as a second threshold value tw. In other words, when the value of the graph line VIa is equal to or greater than the first threshold value th, the switch 305 becomes the ON state, and when the value of the graph line VIa is lower than the second threshold value tw, the switch 305 becomes the OFF state. In the lower chart of FIG. 2, the first threshold value th is 3.2V, and the second threshold value tw is 3V.

First, in a case where a vehicle transitions from an IG-ON state to an IG-OFF state, as shown by the graph line VB in the upper chart of FIG. 2, the voltage value of the voltage BATT of the battery 3 decreases at a predetermined slope. At a time t1a, the graph line VB is 3V, and this represents that the voltage BATT is 3V. In this case, since the voltage BATT is less than the target output voltage value of the switching regulator 10, the value of the graph line VIa of the voltage VIN also becomes 3V. In other words, the voltage value of the voltage VIN becomes equal to or less than the second threshold value tw. As a result, the switch 305 becomes the OFF state, the amplifier circuit 206 stops, the PNP transistor 201 becomes the OFF state, and any current does not flow between the emitter and the collector of the PNP transistor 201. In other words, the series regulator 20a stops operation thereof.

Further, if the voltage value of the voltage VIN becomes equal to or less than 3V, as shown by the graph line VCa, the voltage value of the voltage VCC also decreases. As a result, the voltage VCC becomes a voltage value less than a voltage of 1.2V with which the load 4 is operable.

Here, if the series regulator 20a stops outputting, any current does not flow from the terminal Ta to a terminal Tb. Then, due to self-induced electromotive force generated in a coil 102 of the switching regulator 10 shown in FIG. 1, the voltage temporarily rises so that a current continuously flows in the same direction. As a result, despite the decrease of the voltage value of the battery 3, the value of the voltage VIN increases. Then, when the value of the voltage VIN becomes equal to or greater than the first threshold value th at a time t2a, the amplifier circuit 206 becomes operable, and the PNP transistor 201 becomes the ON state. As a result, a relatively large amount of electric charge flows between the emitter and collector of the PNP transistor 201, and the value of the output voltage VCC of the power supply circuit 1a increases at a predetermined or greater slope.

Subsequently, according to a large amount of current output from the power supply circuit 1a, the voltage value of the voltage VIN decreases at a predetermined or greater slope. Then, the value of the voltage VCC becomes 3V or less at a time t3a within a relatively short time (for example, at a frequency of 20 μsec). As a result, the amplifier circuit 206 stops operation thereof, and the PNP transistor 201 becomes the OFF state and thus any current does not flow between the emitter and the collector of the PNP transistor 201.

When the voltage value of the voltage VIN becomes 3V or less, the value of the voltage VCC also decreases. As a result, the voltage VCC becomes less than the voltage (1.2 V) for operating the load 4. In this case, since the series regulator 20a stops outputting, the value of the voltage VIN which is input from the switching regulator 10 to the circuit 2a increases due to the characteristics of the coil 102 of the switching regulator 10 or the like, as described above. Then, when the value of the voltage VIN becomes the first threshold value th or greater at a time t4a, the amplifier circuit 206 becomes operable, and the PNP transistor 201 becomes the ON state. As a result, a relatively large amount of current flows between the emitter and collector of the PNP transistor 201, and thus the voltage value of the output voltage VCC of the power supply circuit 1a increases at a predetermined or greater slope. When the vehicle transitions to the IG-OFF state, these relatively sudden increases and decreases in voltage value are repeated, whereby the voltage VIN oscillates and the voltage VCC also oscillates. As a result, the voltage for operating the load 4 may become an unstable state.

SUMMARY

It is therefore an object of the present invention to ensure the stability of the voltage value of an output voltage.

In order to achieve the above object, according to an aspect of the embodiments of the present invention, there is provided a power supply circuit comprising: a switching regulator configured to drop a battery voltage to a first specific voltage; a series regulator including a switching element and a capacitor connected at an output stage of the switching element, the series regulator configured to drop the first specific voltage to a second specific voltage, and output the second specific voltage; and a control circuit configured to adjust an amount of electric charge to be accumulated in the capacitor according to a voltage value of the first specific voltage.

The control circuit may be configured to perform control for increasing the electric charge of the capacitor in a case where the first specific voltage is lower than a predetermined voltage, and perform control for decreasing the electric charge of the capacitor in a case where the first specific voltage is higher than a predetermined voltage.

The series regulator may further include an arithmetic circuit configured to output a signal for controlling an operation state of the switching element according to a voltage value of the second specific voltage, and the control by the control circuit for increasing the electric charge may be control for accumulating electric charge from a constant current source in the capacitor, and the control by the control circuit for decreasing the electric charge may be control for causing the electric charge accumulated in the capacitor to flow into the arithmetic circuit.

According to the present invention, an amount of electric charge to be accumulated in the capacitor is regulated according to the voltage value of the first specific voltage. Therefore, it is possible to prevent oscillation of the main voltage of the power supply circuit, thereby ensuring the stability of the voltage value. Also, according to the present invention, it is possible to adjust the change state of the output voltage according to a change in the capacitance of the capacitor, and it is possible to prevent oscillation of the output voltage of the power supply circuit, thereby ensuring the stability of the voltage value.

Further, according to the present invention, it is possible to adjust the change state of the output voltage according to a change in the amount of electric charge flowing into the constant current source, and it is possible to prevent oscillation of the output voltage of the power supply circuit, thereby ensuring the stability of the voltage value.

DETAILED DESCRIPTION OF THE EMBODIMENTS

Hereinafter, an embodiment of the present invention will be described with reference to the accompanying drawings. The following embodiment is merely exemplary and is not intended to limit the technical scope of the present invention of this application.

Embodiment

<1. Configuration of Power Supply Circuit>

Figure 3:
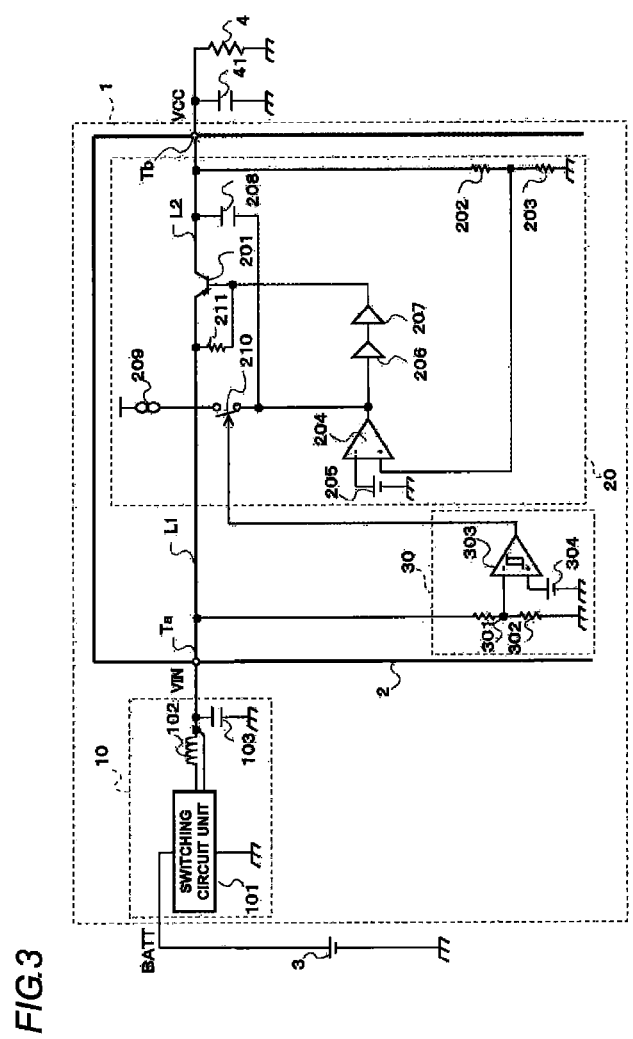
FIG. 3 is a schematic view illustrating the circuit configuration of a power supply circuit according to an embodiment of the present invention.

FIG. 3 is a schematic view illustrating the circuit configuration of a power supply circuit 1. The power supply circuit 1 mainly includes a circuit 2 and a switching regulator 10. The power supply circuit 1 uses the switching regulator 10 to drop a voltage BATT (ideal value thereof is 14 V) input from a battery 3 and outputs a predetermined voltage VIN (a first specific voltage) (ideal value thereof is 6 V). Then, the power supply circuit 1a uses a series regulator 20 of the circuit 2 to drop the voltage VIN, and outputs a predetermined voltage VCC (a second specific voltage) (ideal value thereof is 1.2 V) to a load 4 (for example, a micro computer of an electronic control unit (ECU)). The voltage VIN is an input voltage which is input from the circuit 2 through a terminal Ta, and the voltage VCC is an output voltage which is output from the circuit 2 through a terminal Tb. Further, the ECU may be an engine control ECU for controlling driving of an engine, and the power supply circuit 1 may be used for supplying constant electric power to a micro computer of the ECU.

Also, each of the switching regulator 10 and the series regulator 20 regulates the voltage input thereto within a range having the input voltage as an upper limit, and outputs the regulated voltage. Therefore, if the input voltage becomes lower than a target output voltage, the output voltage also becomes lower than the target output voltage. In other words, if the voltage BATT of the battery becomes lower than the target output voltage of each regulator, according to the drop of the voltage BATT, the voltage VIN obtained by voltage dropping of the switching regulator 10 and the voltage VCC (the voltage of the load 4) obtained by voltage dropping of the series regulator 20 also become lower than the target voltages.

Next, the configuration of the power supply circuit 1 will be described in detail. The power supply circuit 1 mainly includes the circuit 2 and the switching regulator 10. The switching regulator 10 mainly includes a switching circuit unit 101, a coil 102, and a capacitor 103.

The one end of the switching circuit unit 101 is connected to the battery 3, and the other end thereof is connected to one end of the coil 102 which will be described below. Also, the switching circuit unit 101 is connected to a ground. The switching circuit unit 101 converts the voltage BATT into a voltage according to switching control of a switching element (for example, an N-channel metal oxide semiconductor field effect transistor (MOSFET)) provided in the switching circuit unit 101, and outputs the converted voltage.

One end of the coil 102 is connected to the other end of the switching circuit unit 101. The other end of the coil 102 is connected to one end of the capacitor 103 and the terminal Ta of the circuit 2. Also, the other end of the coil 102 is provided with a feedback loop to output a voltage to the switching circuit unit 101.

The one end of the capacitor 103 is connected to the other end of the coil 102 and the terminal Ta of the circuit 2. The other end of the capacitor 103 is connected to the ground.

The coil 102 and the capacitor 103 smooth a voltage output from the switching circuit unit 101 and output the voltage VIN to the circuit 2.

The circuit 2 mainly includes the series regulator 20 and a control circuit 30. The series regulator 20 mainly includes a PNP transistor 201, a resistor 202, a resistor 203, an error amplifier 204, a reference power supply 205, an amplifier circuit 206, a buffer 207, a capacitor 208, a constant current source 209, a switch 210, and a resistor 211.

The emitter of the PNP transistor 201 is connected to the terminal Ta through a signal line L1, and the collector thereof is connected to the terminal Tb through a signal line L2. The base thereof is connected to the output terminal of the buffer 207 for transmitting a signal which is output from the output terminal of the error amplifier 204.

The resistor 202 and the resistor 203 are connected in series between the signal line L2 and the ground. The connection point of the resistor 202 and the resistor 203 is connected to the non-inverting input terminal of the error amplifier 204.

The error amplifier 204 has the non-inverting input terminal, an inverting input terminal, and the output terminal. The non-inverting input terminal is connected to the connection point of the resistor 202 and the resistor 203, and a voltage which is obtained by dividing the voltage VCC with the resistor 202 and the resistor 203 is input to the non-inverting input terminal. The inverting input terminal is connected to the reference power supply 205. The output terminal is connected to the input terminal of the amplifier circuit 206, the other end of the capacitor 208, and one end of the switch 210. The voltage value of the reference power supply 205 is 1.0V, for example. The error amplifier 204 is an arithmetic circuit. In the series regulator 20, the error amplifier 204 may be substituted by an arithmetic circuit other than the error amplifier 204 as long as the arithmetic circuit has the same function as that of the error amplifier 204.

One end of the reference power supply 205 is connected to the inverting input terminal of the error amplifier 204 and the other end of the reference power supply 205 is connected to the ground.

The input terminal of the amplifier circuit 206 is connected to the output terminal of the error amplifier 204 and the output terminal of the amplifier circuit 206 is connected to the input terminal of the buffer 207. The amplifier circuit 206 amplifies the signal level of a signal output from the output terminal of the error amplifier 204. For example, the amplifier circuit 206 amplifies the signal level by a factor of 8.

The input terminal of the buffer 207 is connected to the output terminal of the amplifier circuit 206 and the output terminal of the buffer 207 is connected to the base of the PNP transistor 201. The buffer 207 outputs the signal output from the output terminal of the amplifier circuit 206 to the base of the PNP transistor 201 without attenuating the signal level of the signal.

The one end of the capacitor 208 is connected to the signal line L2 and the other end of the capacitor 208 is connected to the one end of the switch 210 and the output terminal of the error amplifier 204. The capacitor 208 has a function of phase compensation for stabilizing the phase of the signal output from the output terminal of the error amplifier 204, and accumulates electric charge of a current flowing from the constant current source 209 which will be described below. As shown in FIG. 3, the capacitor 208 is provided inside the circuit 2, whereby it is possible to reduce the board area of the circuit.

The constant current source 209 is connected to the other end of the switch 210. The voltage of the constant current source 209 is, for example, 6V, and makes a predetermined current flow continuously.

The one end of the switch 210 is connected to the output terminal of the error amplifier 204 and the one end of the capacitor 208 and the other end of the switch 210 is connected to the constant current source 209. The switch 210 is switched to any one of an ON state and an OFF state on the basis of a signal from the output terminal of a comparator 303 of the control circuit 30.

The resistor 211 is a resistor (a leak cut resistor) for making the potentials of the base and the emitter of the PNP transistor 201 equal to each other when no signal from the output terminal of the buffer 207 is input to the base of the PNP transistor 201, that is, when the signal from the output terminal of the error amplifier 204 is not input to the base of the PNP transistor 201.

The control circuit 30 mainly includes a resistor 301, a resistor 302, the comparator 303, and a reference power supply 304. The resistor 301 and the resistor 302 are connected in series between the signal line L1 and the ground. The connection point of the resistor 301 and the resistor 302 is connected to the inverting input terminal of the comparator 303. The control circuit 30 has a function of controlling the ON or OFF state of the switch 210 according to the voltage value of the voltage VIN, thereby adjusting an amount of electric charge to be accumulated in the capacitor 208.

The inverting input terminal of the comparator 303 is connected to the connection point of the resistor 301 and the resistor 302. The non-inverting input terminal of the comparator 303 is connected to the reference power supply 304. The output terminal of the comparator 303 outputs a high-level signal or a low-level signal to the switch 210 and the switch 210 is configured to be switched to any one of the ON state and the OFF state according to the high-level signal or low-level signal input thereto.

One end of the reference power supply 304 is connected to the non-inverting input terminal of the comparator 303 and the other end of the reference power supply 304 is connected to the ground. The voltage value of the reference power supply 304 is 1.25V, for example.

The switch 210 is switched to the ON state or the OFF state according to the high-level signal or the low-level signal from the output terminal of the comparator 303. In other words, in a case where the high-level signal is output from the output terminal of the comparator 303, the switch 210 is switched to the ON state such that the current of the constant current source 209 flows into the capacitor 208. As a result, the electric charge of the capacitor 208 increases. In a case where the low-level signal is output from the output terminal of the comparator 303, the switch 210 is switched to the OFF state such that the electric charge accumulated in the capacitor 208 flows into the error amplifier 204. As a result, the electric charge of the capacitor 208 decreases.

The terminal Tb of the circuit 2 of the power supply circuit 1 is connected to one end of a capacitor 41 and one end of the load 4. The capacitor 41 and the load 4 are provided outside the power supply circuit 1. The other end of the capacitor 41 and the other end of the load 4 are connected to the ground. The capacitor 41 removes the high frequency components of a voltage which is output from the terminal Tb of the circuit 2, and accumulates the electric charge of a current flowing from the circuit 2 through the terminal Tb. The capacitor 208 and the capacitor 41 may be ceramic capacitors, electrolytic capacitors, or the like.

<2. Operation of Power Supply Circuit>

Next, the operation of the power supply circuit 1 will be described. The switching regulator 10 drops the voltage BATT input from the battery 3, and outputs the voltage VIN. The voltage VIN output from the switching regulator 10 is input to the circuit 2 through the terminal Ta. Then, the voltage VIN input to the circuit 2 is divided with the resistor 301 and the resistor 302. The comparator 303 compares a first voltage which is the divided voltage with a first reference voltage which is the voltage value of the reference power supply 304. Since the operation of the series regulator 20 differs depends on the result of the comparison, when the ideal value of the voltage VIN is set to 6V, a case where the voltage VIN is less than 6V and a case where the voltage VIN is 6V or greater will be separately described.

<2-1. Case Where Voltage VIN is Less Than 6V>

In the case where the voltage VIN is less than 6V, the first voltage obtained by divising the voltage with the resistor 301 and the resistor 302 has a voltage value less than the first reference voltage. Therefore, the comparator 303 outputs the high-level signal from the output terminal thereof. Then, according to the high-level signal output from the output terminal, the switch 210 becomes the ON state and the electric charge of the current flowing from the constant current source 209 is accumulated in the capacitor 208 through the switch 210. In this case, since the voltage of the output terminal of the error amplifier 204 rises, a signal for turning off the PNP transistor 201 is input from the output terminal of the error amplifier 204 to the input terminal of the amplifier circuit 206. Then, the signal for turning off the PNP transistor is output from the output terminal of the amplifier circuit 206 to the base of the PNP transistor 201 through the buffer 207, whereby the PNP transistor 201 becomes the OFF state.

As a result, any current does not flow between the emitter and the collector of the PNP transistor 201, and the electric charge from the constant current source 209 is accumulated in the capacitor 208. Therefore, the decreasing rate of the voltage of the capacitor 41 becomes relatively small. In other words, the decreasing rate of the voltage VCC of the power supply circuit 1 becomes smaller than the decreasing rate of the voltage VCC of the power supply circuit 1a according to the related art.

<2-2. Case Where Voltage VIN is 6V or Greater>

In the case where the voltage VIN is 6V or greater, the first voltage obtained by dividing the voltage with the resistor 301 and the resistor 302 is equal to or greater than the first reference voltage. Therefore, the comparator 303 outputs the low-level signal from the output terminal thereof. Then, according to the low-level signal output from the output terminal, the switch 210 becomes the OFF state, and a current corresponding to the electric charge accumulated in the capacitor 208 flows into the output terminal of the error amplifier 204. Since the switch 210 is in the OFF state, the electric charge of the constant current source 209 does not flow into the capacitor 208. In this case, since the voltage of the output terminal of the error amplifier 204 decreases, a signal input from the output terminal of the error amplifier 204 to the input terminal of the amplifier circuit 206 becomes a signal for driving the PNP transistor 201. Then, the signal for driving the PNP transistor 201 is output from the output terminal of the amplifier circuit 206 to the base of the PNP transistor 201 through the buffer 207, whereby the PNP transistor 201 becomes the ON state. Therefore, a current flows between the emitter and the collector of the PNP transistor 201, whereby the voltage value of the voltage VCC to be output from the terminal Tb of the circuit 2 rises.

As a result, the increasing rate of the voltage of the capacitor 41 becomes relatively small. In other words, the increasing rate of the voltage VCC of the power supply circuit 1 becomes smaller than the increasing rate of the voltage VCC of the power supply circuit 1a according to the related art. As such, the changing rate of the voltage VCC of the power supply circuit 1 becomes smaller than the changing rate of the voltage VCC of the power supply circuit 1a according to the related art. Therefore, it is possible to prevent oscillation of the output voltage VCC of the power supply circuit 1, thereby ensuring the stability of the voltage value. Further, by changing any one factor of the capacitance of the capacitor 208, the amount of current of the constant current source 209, and the amount of current to flow into the error amplifier 204 to arbitrary value in advance, it is possible to adjust an amount of change per unit time in the voltage value of the voltage VCC. As a result, it is possible to prevent oscillation of the voltage VCC, thereby ensure the stability of the voltage value.

<3. Changes with Time in Voltage VIN and Voltage VCC>

Figure 4:
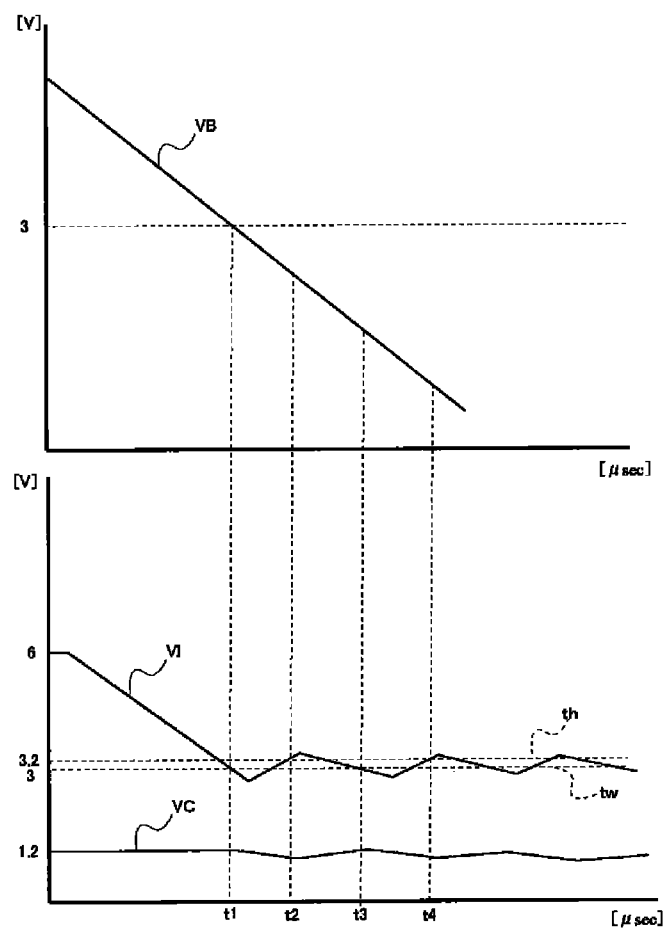
FIG. 4 is charts illustrating changes with time in a voltage BATT, a voltage VIN, and a voltage VCC according to the embodiment of the present invention.

Change with time in the voltage VIN and the voltage VCC will be described be described with reference to FIG. 4. The upper chart of FIG. 4 is a chart illustrating a change with time in the voltage value of the voltage BATT of the battery 3 with a graph line VB. Also, the lower chart of FIG. 4 is a chart illustrating changes with time in the voltage VIN and the voltage VCC with a graph line VI and a graph line VC. In the upper and lower charts of FIG. 4, the vertical axes represent voltage (V), and the horizontal axes represent time (μsec).

In the lower chart of FIG. 4, a higher threshold value of a plurality of threshold values corresponding to the first reference voltage of the comparator 303 is referred to as a first threshold value th, and a lower threshold value of the plurality of threshold values corresponding to the first reference voltage of the comparator 303 is referred to as a second threshold value tw. In other words, when the value of the graph line VI is equal to or greater than the first threshold value th, the switch 210 becomes the ON state, and when the value of the graph line VI is lower than the second threshold value tw, the switch becomes the OFF state. In the lower chart of FIG. 4, the first threshold value th is 3.2V, and the second threshold value tw is 3V.

First, in a case where a vehicle transitions from an IG-ON state to an IG-OFF state, as shown by the graph line VB in the upper chart of FIG. 4, the voltage value of the voltage BATT of the battery 3 decreases at a predetermined slope. At a time t1, the graph line VB represents 3V, and this represents that the voltage BATT is 3V. In this case, since the voltage BATT is less than the target voltage value of the switching regulator 10, the value of the graph line VI of the voltage VIN also becomes 3V. In other words, the voltage value of the voltage VIN becomes equal to or less than the second threshold value tw. As a result, the switch 210 becomes the OFF state, the amplifier circuit 206 stops operation thereof, the PNP transistor 201 becomes the OFF state, and any current does not flow between the emitter and the collector of the PNP transistor 201. In other words, the series regulator 20 stops outputting.

Further, if the voltage value of the voltage VIN becomes equal to or less than 3V, as shown by the graph line VC, the voltage VCC also decreases. As a result, the voltage VCC becomes a voltage value less than a voltage of 1.2V with which the load 4 is operable. If the series regulator 20 stops outputting, any current does not flow from the terminal Ta to the terminal Tb. Then, due to self-induced electromotive force generated in the coil 102 of the switching regulator 10 shown in FIG. 3, the voltage temporarily rises so that the current continuously flows in the same direction. As a result, despite the decrease of the voltage value of the battery 3, the value of the voltage VIN increases.

Figure 2:
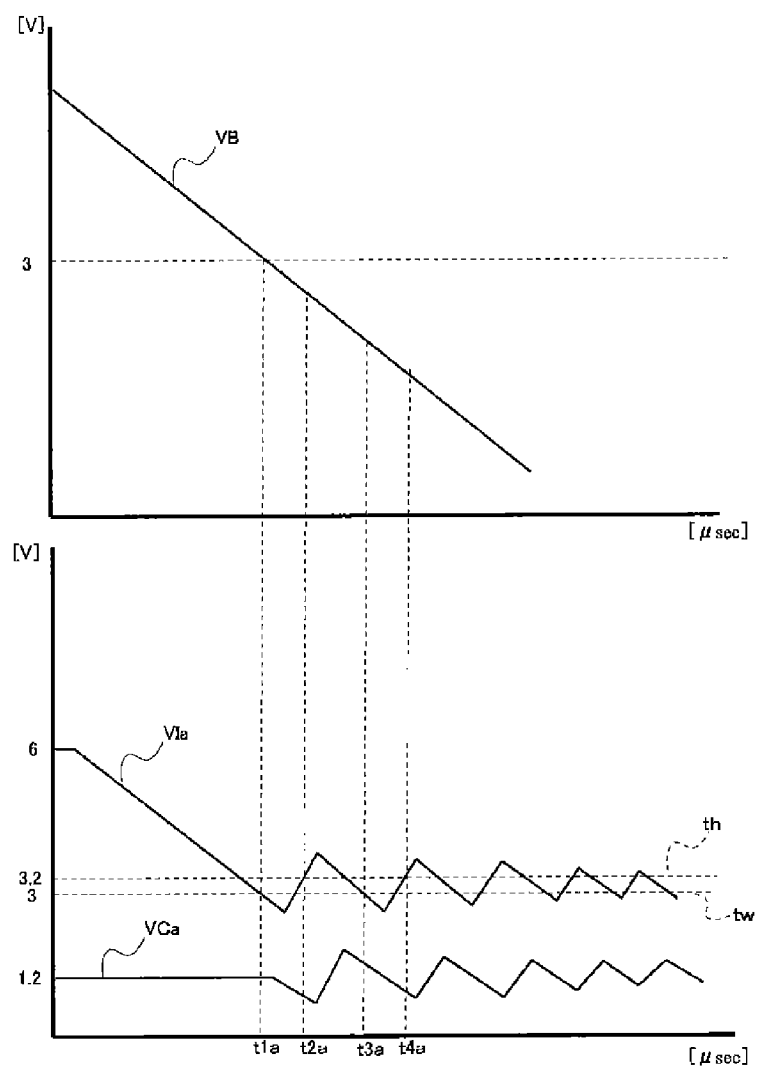
FIG. 2 is charts illustrating changes with time in a voltage BATT, a voltage VIN, and a voltage VCC according to the related art.

Then, when the value of the voltage VIN becomes equal to or greater than the first threshold value th at a time t2, the PNP transistor 201 becomes the ON state. As a result, electric charge flows between the emitter and collector of the PNP transistor 201, and the value of the output voltage VCC of the power supply circuit 1 increases. As the graph line VI of FIG. 4 representing the voltage VIN is compared to the graph line VIa of FIG. 2 representing the voltage VIN, it can be recognized that the changing rate of the graph line VI of FIG. 4 is smaller than the changing rate of the graph line VIa of FIG. 2. In other words, the timing when the value of the voltage VIN becomes equal to or greater than the first threshold value th is the time t2 later than the time t2a.

Figure 1:
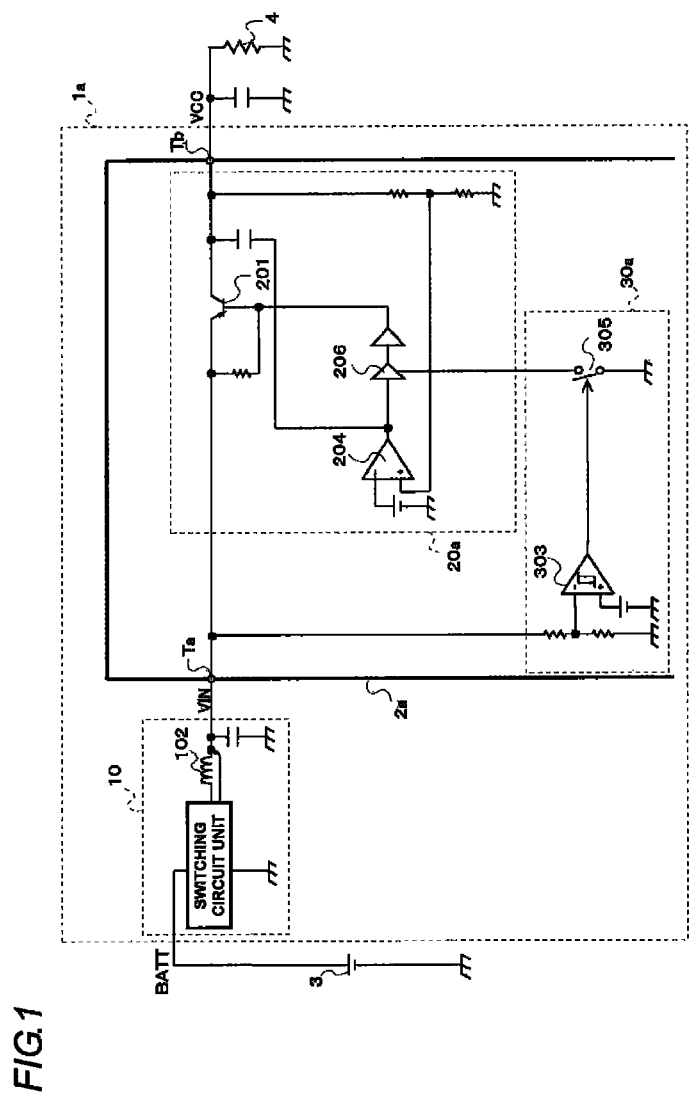
FIG. 1 is a schematic view illustrating the circuit configuration of a power supply circuit according to the related art.

The voltage value of the voltage VCC changes according to increase or decrease in the electric charge of the capacitor 208. In this embodiment, since a difference in potential between the emitter and the collector of the PNP transistor 201 is set to be relatively small by accumulating electric charge in the capacitor 208 while the PNP transistor 201 is in the OFF state, it is possible to reduce the changing rate of the voltage VCC of the power supply circuit 1 shown in FIG. 3, as compared to the changing rate of the voltage VCC of the power supply circuit 1a according to the related art shown in FIG. 1. Therefore, the time intervals of switching of the PNP transistor 201 between the ON state and the OFF state in the power supply circuit 1 according to this embodiment are longer than those of the power supply circuit 1a according to the related art.

As a result, as shown by the graph line VI in FIG. 4, the amplitude of the voltage VIN of the power supply circuit 1 becomes smaller and the period of the voltage YIN becomes longer, as compared with the graph line VIa in FIG. 2. In other words, a change per unit time in the voltage value of the voltage VIN becomes smaller as compared to the related art. Further, as shown by the graph line VC in FIG. 4, the amplitude of the voltage VCC of the power supply circuit 1 becomes smaller and the period of the voltage VCC becomes longer, as compared to the graph line VCa in FIG. 2.

In other words, a period from the time t1 to a time t3 which is one period of the graph line VI and the graph line VC corresponding to the voltage VIN and the voltage VCC of the power supply circuit 1 is longer than a period from the time t1a to the time t3a regarding the power supply circuit 1a. The amplitudes of the graph line W and the graph line VC are also smaller as compared with the graph line VIa and the graph line VCa. As such, from the time t1, the values of the graph line VI and the graph line VC change according to changes of the voltage VIN and the voltage VCC.

Thereafter, as a state where the voltage value of the voltage VCC corresponding to the graph line VC is smaller than a voltage value with which the load 4 is operable continues, the operation of the load 4 completely stops. Therefore, it is possible to prevent oscillation of the output voltage VCC of the power supply circuit 1, thereby ensuring the stability of the voltage value. Like this, according to the configuration of this embodiment, in a case of the IG-ON state, the power supply circuit 1 can output the output voltage corresponding to the target voltage to the load 4, and in a case of the transition from the IG-ON state to the IG-OFF state, that is, in a case where the input voltage decreases with time, it is possible to prevent oscillation of the output voltage.

<Modifications>

Although the embodiment of the present invention has been described above, the present invention is not limited to the above-mentioned embodiment but can be variously modified. Hereinafter, these modifications will be described. The above-mentioned embodiment and the following modifications can be appropriately combined.

In the above-mentioned embodiment, the capacitor 208 shown in FIG. 3 is provided inside the circuit 2 of the power supply circuit 1. However, the capacitor 208 may be provided outside the circuit 2. In the case where the capacitor is provided inside the circuit 2, there are limits on the capacitance of the capacitor due to the relation with the other internal elements of the circuit 2. However, in the case of providing the capacitor outside the circuit 2, since there is no influence of the other internal elements of the circuit 2, it is possible to set the capacitance to be larger than that in the case of providing the capacitor inside the circuit 2. Specifically, for example, assuming that the capacitance in the case of providing the capacitor 208 inside the circuit 2 is 10 pF, in the case of providing the capacitor 208 outside the circuit 2, it is possible to set the capacitance to 0.1 µF which is $10^4$ times of 10 pF. Also, if the capacitor 208 is provided outside the circuit 2, it is possible to reduce the number of internal components of the circuit 2.

In the above-mentioned embodiment, the power supply circuit 1 shown in FIG. 3 includes the switching regulator 10 having the coil 102 at the input stage of the circuit 2. However, it is not necessarily needed to provide the switching regulator 10 having the coil 102. For example, a series regulator may be provided at the input stage of the circuit 2 to drop the voltage of the battery 3 to the target voltage (the voltage VIN). In this case, it is possible to prevent the rising voltage value of the voltage VCC per unit time from becoming a relatively large voltage value to exceed the target voltage (for example, 1.2V) (to overshoot), and to make a change per unit time in the voltage when the voltage VCC rises a relatively small value.

Also, in the above-mentioned embodiment, the PNP transistor 201 is employed as a switching element. However, it is possible to change the circuit configuration and substitute the PNP transistor 201 by another switching element (for example, an NPN transistor).

Also, in the above-mentioned embodiment, the voltage values of the voltages (the input voltage and the output voltage) corresponding to the driving of each regulator described with reference to FIG. 3 are mere an example. As long as the characteristics of the input and output voltages of each regulator are kept, other voltage values may be used.

Also, in the above-mentioned embodiment, the constant current source 209 is provided inside the series regulator 20. However, it may be provided outside the series regulator 20.

What is claimed is:

1. A power supply circuit comprising:
a switching regulator configured to drop a battery voltage to a first specific voltage;
a series regulator including a first switching element and a capacitor having a first end connected at an output stage of the first switching element and a second end connected to a second switching element, the series regulator being configured to (i) drop the first specific voltage to a second specific voltage, and (ii) output the second specific voltage; and
a control circuit configured to adjust an amount of electric charge to be accumulated in the capacitor by controlling the second switching element according to a voltage value of the first specific voltage.

2. A power supply circuit comprising:
a switching regulator configured to drop a battery voltage to a first specific voltage;
a series regulator including a switching element and a capacitor connected at an output stage of the switching element, the series regulator being configured to (i) drop the first specific voltage to a second specific voltage, and (ii) output the second specific voltage; and
a control circuit configured to adjust an amount of electric charge to be accumulated in the capacitor according to a voltage value of the first specific voltage,
wherein the control circuit is configured to perform control for increasing the electric charge of the capacitor in a case where the first specific voltage is lower than a predetermined voltage, and perform control for decreasing the electric charge of the capacitor in a case where the first specific voltage is higher than the predetermined voltage.

3. The power supply circuit according to claim 2,
wherein the series regulator further includes an arithmetic circuit configured to output a signal for controlling an operation state of the switching element according to a voltage value of the second specific voltage, and
wherein the control by the control circuit for increasing the electric charge is control for accumulating electric charge from a constant current source in the capacitor, and the control by the control circuit for decreasing the electric charge is control for causing the electric charge accumulated in the capacitor to flow into the arithmetic circuit.

4. The power supply circuit according to claim 1, wherein the control circuit controls the series regulator to adjust the amount of electric charge to be accumulated in the capacitor.

5. A power supply circuit comprising:
a switching regulator configured to drop a battery voltage to a first specific voltage;
a series regulator including a switching element and a capacitor connected between an output stage of the switching element and an electric charge source, the series regulator being configured to (i) drop the first specific voltage to a second specific voltage, and (ii) output the second specific voltage; and
a control circuit configured to adjust an amount of electric charge to be accumulated in the capacitor by controlling the connection between the capacitor and the electric charge source according to a voltage value of the first specific voltage.

* * * * *